United States Patent [19]

Leathers-Wiessner

[11] Patent Number: 5,051,539
[45] Date of Patent: Sep. 24, 1991

[54] SWIVEL JOINT FOR COVER OF FLUID-COOLED WELDING CABLE

[75] Inventor: Susan Leathers-Wiessner, Portage, Mich.

[73] Assignee: Dave A. Leathers, Scotts, Mich. ; a part interest

[21] Appl. No.: 534,434

[22] Filed: Jun. 7, 1990

[51] Int. Cl.⁵ ............................................. H01B 7/34
[52] U.S. Cl. ............................... 174/15.7; 174/21 JR; 174/86; 285/272; 403/164
[58] Field of Search .................. 174/15.7, 21 JR, 86; 285/272, 907; 403/164

[56] References Cited

U.S. PATENT DOCUMENTS

| | | | |
|---|---|---|---|
| 1,166,579 | 1/1916 | Clay | 285/272 X |
| 2,389,340 | 11/1945 | Bateman | 174/86 |
| 2,399,823 | 5/1946 | Phillips | 174/21 J R |
| 2,407,445 | 9/1946 | Phillips | 174/21 J R |
| 2,440,668 | 4/1948 | Tarbox | 174/95 |
| 3,456,064 | 7/1969 | Toto | 174/15.7 |
| 3,551,581 | 12/1970 | Goodman | 174/15.7 |
| 4,199,653 | 4/1980 | Talley | 174/15.7 |
| 4,310,718 | 1/1982 | Eng | 174/15.7 |
| 4,432,558 | 2/1984 | Westerlund et al. | 285/272 |
| 4,640,982 | 2/1987 | Kasper et al. | 174/15.7 X |

OTHER PUBLICATIONS

Catalog, "Cables for Resistance Welding", CAL Manufacturing Company, Inc., 15 pages.
Marketing Brochure, "Air Carbon Arc Manual Torches", Arcair, 8 pages.

Primary Examiner—Morris H. Nimmo
Attorney, Agent, or Firm—Flynn, Thiel, Boutell & Tanis

[57] ABSTRACT

A welding cable has connectors at each end, and a plurality of electrical conductors extending through the cable from one connector to the other. An insulating element includes a tubular outer wall, and a plurality of wall portions extending radially in respective directions from the central portion to the outer wall, each conductor being disposed in a passageway defined by a respective pair of adjacent radial wall portions and a portion of the outer wall. The connectors at the ends of the cable facilitate a flow of cooling water through the passageways in the insulating element. The insulating element extends through a pair of axially spaced, tubular cover portions, each of which has one end clamped to a respective connector. The other end of each cover portion is sealingly connected to a tubular swivel arrangement which facilitates rotation of the cover portions relative to each other and effects a fluid-tight coupling of the cover portions, the insulating element extending through the tubular swivel arrangement.

17 Claims, 1 Drawing Sheet

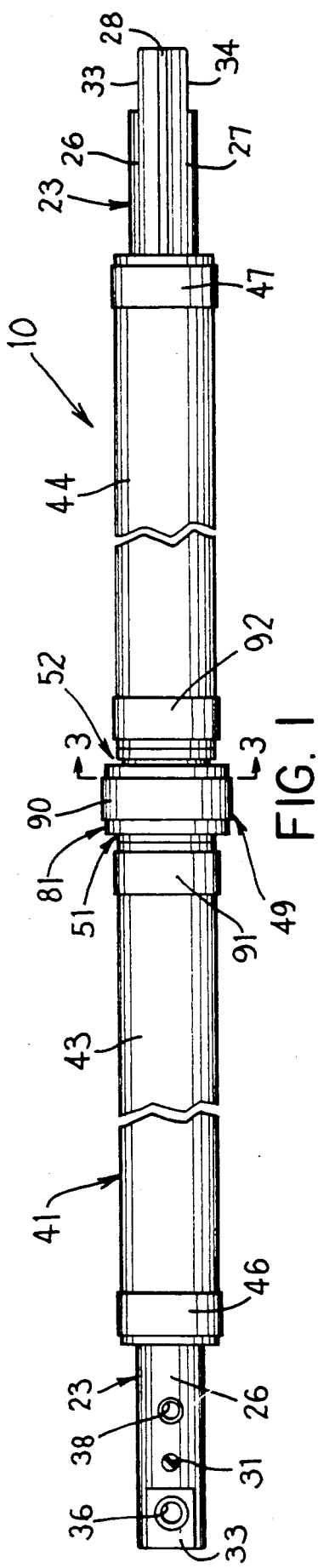
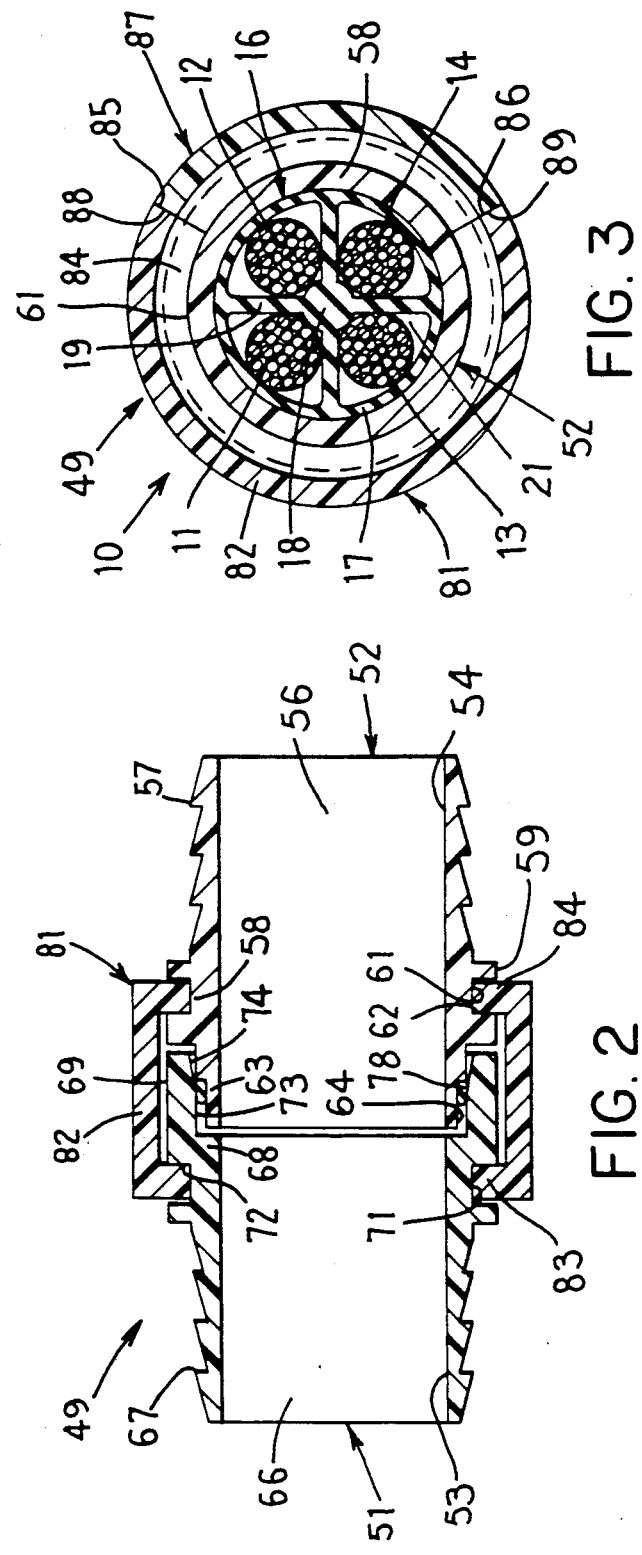

SWIVEL JOINT FOR COVER OF FLUID-COOLED WELDING CABLE

FIELD OF THE INVENTION

This invention relates generally to a welding cable and, more specifically, to a welding cable having a tubular cover through which a cooling fluid flows during operational use of the cable.

BACKGROUND OF THE INVENTION

An example of a conventional resistance spot welding machine is a machine disposed along a production line for automobile bodies, the machine having a robot arm which is moved between a retracted position and one or more spot welding positions as each automobile body on the assembly line passes the machine. Large bursts of electrical current are required to carry out resistance spot welding, and thus a welding cable supplying electricity to the robot arm must have one or more copper conductor ropes of significant diameter. These conductors tend to become heated as a result of the large currents flowing through them, and therefore it is conventional to provide a tubular hoselike cover which extends the length of the cable, and to pump a cooling fluid through the cable from one end to the other during use of the cable.

The hoselike cable covers are typically rather stiff, and they tend to produce significant resistance to torsional movement of the cable, namely twisting of the cable about its lengthwise axis. Since a robot arm must be able to carry out a wide range of movements in order to access hard-to-reach welding locations, there are many applications where a welding cable must be capable of carrying out a reasonable degree of torsional movement without exerting excessive resistance to such movement onto the robot arm. Consequently, for different existing robot arms, it has become customary to specify for each arm the maximum resistance which an associated welding cable of a specified length is permitted to offer to a specified amount of torsional movement, because if the cable exerts resistive forces in excess of this amount on the robot arm, the design parameters of the robot arm may be exceeded so that the arm either fails to function and/or is physically damaged.

Due to the stiffness inherently present in the welding cable covers conventionally provided to facilitate cable protection and fluid cooling, the resistance to torsional movement in most existing welding cable designs is typically very close to the specified maximums, which means that each cable manufactured must be carefully tested in order to ensure that it in fact meets the specifications. Further, even as to cables which do meet the specifications, the forces exerted on the tubular cable cover in applications which involve a significant amount of repetitive torsional cable movement tend to lead to cover failure and thus a reduction in the average useful lifetime of the cable.

A further problem exists in conventional cables of this type which have more than one electrical conductor. In particular, a conventional cable may have two conductors, each of which includes two copper conductor ropes. Thus, there are four conductors extending through the cable, and an insulating element is provided to prevent them from touching each other and creating an electrical short. In the conventional cable, this insulating element has the cross-sectional shape of a cross, including an elongate central portion with four walls extending outwardly in respective radial directions, each wall being disposed between a respective pair of the conductors. Due to the fact that large bursts of current pass through these welding cables, the cables tend to "kick", jump and twist in response to the electrical current. This, coupled with torsional cable movement in applications requiring torsional movement, sometimes causes a portion of one radial wall to shift in position so that the conductors on opposite sides of it can touch each other, thereby creating an electrical short which renders the cable useless and necessitates it replacement, resulting in both downtime for the assembly line and also additional cost for the replacement cable.

An object of the invention is therefore to provide a fluid-cooled welding cable with a cover which presents minimal resistance to torsional cable movement.

A further object of the invention is to provide a multi-conductor welding cable having an arrangement which reliably maintains the conductors in electrical isolation from each other despite the kicking, jumping and twisting which typically accompanies conduction of current bursts through the cable.

SUMMARY OF THE INVENTION

The objects and purposes of the invention, including those set forth above, are met according to a first form of the present invention by providing a welding cable which includes an elongate electrical conductor, a cover having axially spaced first and second tubular cover portions, the conductor extending through the tubular cover portions, and a tubular swivel arrangement disposed between and coupled to each of the cover portions for facilitating rotation of the cover portions relative to each other about a lengthwise axis of the cable, the conductor extending through the tubular swivel arrangement.

A different feature of the invention involves the provision of a swivel mechanism which includes first and second tubular swivel parts supported for rotation relative to each other about an axis, and a holding arrangement for preventing relative axial movement of the swivel parts, the holding arrangement including a circumferentially extending groove in each swivel part and including a holding part having first and second axially spaced arcuate ribs which are each slidably disposed in a respective groove.

A further feature of the invention involves the provision of a welding cable which includes a plurality of elongate electrical conductors, and an elongate insulating element having a plurality of separate spaced lengthwise passageways, each conductor extending through a respective passageway so as to be surrounded on all sides by the insulating element.

BRIEF DESCRIPTION OF THE DRAWINGS

A preferred embodiment of the invention will be described in detail hereinafter with reference to the accompanying drawing, in which:

FIG. 1 is an elevational side view of a welding cable embodying the present invention;

FIG. 2 is a central sectional side view of a swivel joint which is a component of the welding cable of FIG. 1; and FIG. 3 is a sectional view taken along the line 3—3 in FIG. 1.

DETAILED DESCRIPTION

FIG. 1 depicts a welding cable 10 which embodies the present invention. The cable 10, as shown in the sectional view of FIG. 3, has extending through it four elongate electrical conductors 11-14, each of the conductors 11-14 being a copper rope.

The cable 10 also includes an elongate insulating element 16 which, in the preferred embodiment, is made of rubber, neoprene or synthetic resin. The insulating element 16 has a circular outer wall 17, a cylindrical center part 18, and four uniformly angularly spaced radial walls 19 which extend radially from the center part 18 to the outer wall 17. The outer wall 17, center part 18 and radial walls 19 are all integral portions of the insulating element 16. The radial walls 19 define four sector-shaped passageways 21 which extend lengthwise through the insulating element 16 and which are free of fluid communication with each other, each of the passageways 21 having disposed therein a respective one of the conductors 11-14. In the preferred embodiment, the conductors 11-14 and the radial walls 19 follow a helical path from one end of the cable to the other.

Referring again to FIG. 1, the cable has at each end thereof a connector 23. The connectors 23 are identical and conventional, but are briefly described for convenience. Each connector 23 includes two metal terminals 26 and 27, which are approximately semi-cylindrical and which each have a flat surface disposed against a respective side of a plate 28 made of an insulating material. The terminal 26 is connected to the two conductors 11 and 12 in a conventional manner, and the terminal 27 is similarly connected to the conductors 13 and 14. The terminals 26 and 27 are secured to each other in a conventional manner by a screw 31. The head and shank of the screw 31 are insulated from the terminal 26 by conventional and not-illustrated insulating parts, the shank of the screw 31 threadedly engaging a not-illustrated threaded hole provided in the terminal 27. The metal terminals 26 and 27 each have at an outer end a respective flat surface 33 or 34, the surfaces 33 and 34 facing in opposite directions and being parallel. A cylindrical bolt hole 36 extends between the surfaces 33 and 34 perpendicular thereto through the terminals 26 and 27 and the plate 28. On the opposite side of the screw 31 from the bolt hole 36 is a water hole 38, which extends through the terminals 26 and 27 and the plate 28 parallel to the bolt hole 36. In a conventional manner, the terminals 26 and 27 each have in the flat surface thereof which is disposed against the plate 28 a groove extending from the water hole 38 to the inner end of the terminal. When the cable is in use, cooling water is forced under pressure into the water hole 38 at one end of the cable 10, flows through the grooves in the terminals 26 and 27 and into the cable, flows through the passageways 21 in the insulating element 16 to the opposite end of the cable, and flows through the grooves in the opposite connector 23 and out the water hole 38 of that connector.

The cable 10 has a tubular cover 41 which is made from a conventional and commercially available one braid rubber hose material having an inside diameter which is a little larger than the outside diameter of the insulating element 16, the insulating element 16 extending through the interior of the cover 41. The cover 41 has two portions 43 and 44 which are axially spaced, and which each have an axially outer end tightly encircling a respective connector 23 and sealingly secured to the connector 23 by a respective conventional metal clamp or strap 46 or 47.

Located between the cover portions 43 and 44 is a swivel joint 49. Referring to FIGS. 2 and 3, the swivel joint 49 includes two tubular plastic swivel parts 51 and 52 having respective cylindrical inner surfaces 53 and 54 which each have an inside diameter only slightly larger than the outside diameter of the insulating element 16. Some cooling water may flow along the outside of the element 16 and thus between the element 16 and the surfaces 53 and 54, but most of the cooling water will flow through the passageways 21 in the element 16.

The swivel part 52 has at one end an outer end portion 52 which has three circumferentially extending ribs 57, each rib 57 having a cross section of sawtooth shape. A middle portion 58 of the swivel part 52 has a cylindrical outer surface 59 with an outside diameter larger than the rest of the swivel part 52. A circumferentially extending groove 61 of rectangular cross section is provided in the surface 59, the groove 61 having an annular side surface 62 which faces axially toward the end portion 56 of the swivel part 52. An inner end portion 63 of the swivel part 52 has an outwardly facing cylindrical surface 64.

The swivel part 51 has an outer end portion 66 with circumferential ribs 67 having a saw-tooth cross sectional shape. An inner end portion 68 of the swivel part 51 has on it a cylindrical outer surface 69 with an outside diameter greater than that of the rest of the swivel part 51. A circumferentially extending groove 71 of rectangular cross section is provided in the surface 69, and has an annular side surface 72 which faces axially toward the outer end portion 66 of swivel part 51. The inner end portion 68 of the swivel part 51 has a radially inwardly facing cylindrical surface 73 merging into a frustoconical surface portion 74 which diverges in diameter to the inner end of the inner end portion 68 of swivel part 51. The inner end portion 63 of swivel part 52 is disposed concentrically within the inner end portion 68 of swivel part 51, so that the radially outwardly facing cylindrical outer surface 64 on swivel part 52 faces and is spaced slightly from the radially inwardly facing cylindrical surface portion 73 on the swivel part 51. An annular seal 78 made of a resilient material such as rubber or a synthetic resin closely encircles the radially outwardly facing cylindrical surface 64 on the swivel part 52, and is compressed between the facing cylindrical surfaces 64 and 73 in order to create a fluid-tight seal between the swivel parts 51 and 52. During assembly of the swivel joint 49, the annular seal 78 slides on the frusto-conical surface portion 74 and then onto the cylindrical surface portion 73, the frustoconical surface portion 74 effecting radial compression of the seal.

An arcuate plastic holding part 81 has a cylindrical main wall 82, and has at opposite axial edges of the main wall 82 two radially inwardly extending arcuate ribs 83 and 84, each of which is slidably disposed in a respective one of the grooves 61 and 71 and slidably engages a respective one of the axially facing side surfaces 62 and 72 in the grooves in order to prevent the swivel parts 51 and 52 from moving axially apart from each other. Referring to FIG. 3, the holding part 81 has ends at 85 and 86, and in the preferred embodiment has an angular length of 240°.

A further plastic holding part 87 is identical to the part 81, except that the part 87 has an arcuate length of only 120°, ends 88 and 89 of the holding part 87 respectively butting against the ends 85 and 86 of the holding part 81. It will be recognized that the angular lengths of the holding parts 81 and 87 could be different, and for example that each holding part could have an angular length of 180°. In order holding parts 81 and 87 securely in position, a metal strap or clamp 90 (FIG. 1) closely concentrically encircles the holding parts.

The outer end portions 66 and 56 of the swivel parts 51 and 52 are respectively inserted into the ends of the tubular cover portions 43 and 44, the tubular cover portions tightly encircling the end portions of the swivel parts, and the saw-tooth ribs 67 and 57 resisting detachment of the cover portions from the swivel parts. Further, metal straps or clamps 91 and 92 tightly encircle these ends of the tubular cover portions 43 and 44 in order to tightly clamp them on the outer end portions 66 and 56 of the swivel parts 51 and 52 in a manner producing fluid-tight seals between the cover portions 43 and 44 and the swivel parts 51 and 52.

OPERATION

In operation, the connector parts 23 at opposite ends of the cable 10 are connected in a conventional manner to a conventional resistance spot welding device. One end of the cable 10 is typically connected to a movable arm or the like, for example a robot arm which moves from a retracted position to one or more welding positions where it creates respective spot welds on a device moving past it on an assembly line, for example a car body moving down an assembly line. In many applications, the required movement of the arm necessitates torsional movement of the cable. During this torsional movement, the swivel joint 49 permits the portions 43 and 44 of the tubular cover 41 to rotate relative to each other very freely, the arcuate ribs 83 and 84 on the holding parts 81 and 82 sliding within one or both grooves 61 and 71, and one or both of the cylindrical surfaces 64 and 73 sliding relative to the compressed annular seal 78. As a result, the robot arm of the welding machine can move between its retracted position and each of its welding positions easily and freely, because the amount of torque required to twist the welding cable 10 as the robot arm moves is significantly less than would be required in the case of a conventional, cable lacking the inventive swivel joint 49. In fact, the swivel joint 49 renders the resistance to torsional movement to be so low that it is not necessary to extensively test each cable manufactured in order to be certain it meets typical industry specifications. Further, the reduced stress on the cover gives the cable a longer effective lifetime.

As welding is carried out, the large bursts of electrical current passing through the cable 10 cause the cable to "kick", jump and twist in a relatively severe manner. As previously discussed, the insulating element 16 in the inventive cable 10 includes not only the center part 18 and radially extending walls 19 which are present in conventional insulating elements, but in addition includes the tubular cylindrical outer wall 17 which is integrally connected to the outer ends of the radial walls 19, thereby creating the separate lengthwise passageways 21 through the insulating element which each receive a respective conductor. As a result, no matter how much the cable kicks and twists as bursts of current pass through the conductors 11-14, each conductor always remains in a separate passageway 21, and there is no way that portions of the insulating element 16 can move to positions in which two adjacent conductors touch each other and create an electrical short which renders the cable useless.

One preferred embodiment of the invention has been described in detail for illustrative purposes, but it will be recognized that there are variations or modifications of the preferred embodiment, including the rearrangement of parts, which lie within the scope of the claims.

The embodiments of the invention in which an exclusive property or privilege is claimed are defined as follows:

1. A welding cable comprising: an elongate electrical conductor; a cover having axially spaced first and second tubular cover portions, said conductor extending through said tubular cover portions; and tubular swivel means disposed between and coupled to each of said tubular cover portions for facilitating rotation of said tubular cover portions relative to each other about a lengthwise axis of said cable, said conductor extending through said tubular swivel means; wherein said swivel means includes first and second tubular swivel parts supported for rotation relative to each other and each secured to a respective one of said first and second tubular cover portions; wherein said first and second swivel parts have thereon respective annular sealing surfaces which face each other; wherein said swivel means includes an annular seal disposed between and sealingly engaging said annular sealing surfaces, said first and second swivel parts being respectively sealingly secured to said first and second tubular cover portions; wherein said first and second sealing surfaces are cylindrical surfaces which respectively face radially inwardly and radially outwardly; and including holding means for preventing relative axial movement of said first and second swivel parts, wherein said holding means includes each said swivel part having a circumferentially extending groove in an outer surface thereof; and wherein said holding means includes a first holding part having first and second radially inwardly projecting arcuate ribs which each slidably engage the groove in a respective one of said first and second swivel parts.

2. A cable as recited in claim 1, including means for facilitating a flow of cooling fluid through said cable within said tubular cover.

3. A cable as recited in claim 2, including a plurality of electrical conductors, and including an elongate insulating element which has a plurality of lengthwise passageways therethrough and which extends through each of said cover portions, each said conductor being disposed in a respective one of said passageways in said insulating element.

4. A cable as recited in claim 3, wherein said insulating element includes a tubular outer wall, an elongate central portion extending centrally within said tubular outer wall portion, and a plurality of wall portions which extend radially from said central portion to said outer wall.

5. A cable as recited in claim 4, wherein said outer wall, central portion and radially extending wall portions are all integral portions of said insulating element.

6. A cable as recited in claim 5, wherein said holding means includes a second holding part having two arcuate ribs which each slidably engage the groove in a respective one of said first and second swivel parts, and including a clamping strap extending circumferentially around said first and second holding parts.

7. A cable as recited in claim 6, wherein said first holding part has an angular length of approximately 240°, and said second holding part has an angular length of approximately 120°.

8. A welding cable comprising: an elongate electrical conductor; a cover having axially spaced first and second tubular cover portions, said conductor extending through said tubular cover portions; and tubular swivel means disposed between and coupled to each of said tubular cover portions for facilitating rotation of said tubular cover portions relative to each other about a lengthwise axis of said cable, said conductor extending through said tubular swivel means; wherein said swivel means includes first and second tubular swivel parts supported for rotation relative to each other and each secured to a respective one of said first and second tubular cover portions; wherein said first and second swivel parts have a portion which is tightly inserted in an end of a respective one of said tubular cover portions and which has a plurality of axially spaced, radially outwardly projecting ribs of saw-tooth cross section; and including two clamping straps which each extend tightly around an end of a respective one of said tubular cover portions adjacent said swivel means.

9. A cable as recited in claim 8, wherein said first and second swivel parts have thereon respective annular sealing surfaces which face each other, wherein said swivel means includes an annular seal disposed between and sealingly engaging said annular sealing surfaces, said first and second swivel parts being respectively sealingly secured to said first and second tubular cover portions.

10. A cable as recited in claim 9, wherein said first and second sealing surfaces are cylindrical surfaces which respectively face radially inwardly and radially outwardly, and including holding means for preventing relative axial movement of said first and second swivel parts.

11. A swivel mechanism, comprising: first and second tubular swivel parts supported for rotation relative to each other about an axis, and holding means for preventing relative axial movement of said swivel parts; said holding means including a holding part, and cooperating rib and groove means for limiting axial movement of each said swivel part relative to said holding part, said rib and groove means including first and second axially spaced ribs which respectively slidably engage first and second circumferentially extending grooves, one of said first rib and first groove being provided on said first swivel part and the other thereof on said holding part, and one of said second rib and second groove being provided on said second swivel part and the other thereof on said holding part; wherein each of said swivel parts has thereon an annular sealing surface concentric to said axis, said sealing surfaces facing each other; including an annular seal disposed between and sealingly engaging each of said sealing surfaces; and wherein each of said swivel parts is tubular and has at an axial end remote from the other thereof a portion with axially spaced, circumferentially extending, radially outwardly projecting ribs of saw-tooth shape.

12. A swivel mechanism, comprising: first and second tubular swivel parts supported for rotation relative to each other about an axis, and holding means for preventing relative axial movement of said swivel parts; said holding means including a holding part, and cooperating rib and groove means for limiting axial movement of each said swivel part relative to said holding part, said rib and groove means including first and second axially spaced ribs which respectively slidably engage first and second circumferentially extending grooves, one of said first rib and first groove being provided on said first swivel part and the other thereof on said holding part, and one of said second rib and second groove being provided on said second swivel part and the other thereof on said holding part; wherein each of said swivel parts has thereon an annular sealing surface concentric to said axis, said sealing surfaces facing each other; including an annular seal disposed between and sealingly engaging each of said sealing surfaces; and wherein said sealing surface on said first swivel part is a radially inwardly facing cylindrical surface and said sealing surface on said second swivel part is a radially outwardly facing cylindrical surface.

13. A swivel mechanism, comprising: first and second tubular swivel parts supported for rotation relative to each other about an axis, and holding means for preventing relative axial movement of said swivel parts; said holding means including a first holding part, and cooperating rib and groove means for limiting axial movement of each said swivel part relative to said first holding part, said rib and groove means including first and second axially spaced ribs which respectively slidably engage first and second circumferentially extending grooves, one of said first rib and first groove being provided on said first swivel part and the other thereof on said first holding part, and one of said second rib and second groove being provided on said second swivel part and the other thereof on said first holding part; wherein said first and second grooves are respectively provided in said first and second swivel parts; and wherein said holding means includes a second holding part having two axially spaced arcuate ribs thereon which are each slidably disposed in a respective one of said grooves, and includes a clamping strap closely circumferentially encircling said first and second holding parts.

14. A device as recited in claim 13, wherein each of said swivel parts has thereon an annular sealing surface concentric to said axis, said sealing surfaces facing each other, and including an annular seal disposed between and sealingly engaging each of said sealing surfaces.

15. A device as recited in claim 13, wherein said first holding part has an angular length of approximately 240°, and said second holding part has an angular length of approximately 120°.

16. A welding cable comprising: an elongate electrical conductor; a cover having axially spaced first and second tubular cover portions, said conductor extending through said tubular cover portions; and tubular swivel means disposed between and coupled to each of said tubular cover portions for facilitating rotation of said tubular cover portions relative to each other about a lengthwise axis of said cable, said conductor extending through said tubular swivel means; wherein said swivel means includes first and second tubular swivel parts supported for rotation relative to each other and each secured to a respective one of said first and second tubular cover portions; wherein said first and second swivel parts each have a portion which is tightly inserted in an end of a respective one of said tubular cover portions and which has a radially outwardly projecting annular rib; and including two clamping straps which each extend tightly around an end of a respective one of said tubular cover portions adjacent said swivel means.

17. A cable as recited in claim 16, wherein said first and second swivel parts each have on said portion thereof a plurality of radially outwardly projecting annular ribs which are axially spaced.

* * * * *

UNITED STATES PATENT AND TRADEMARK OFFICE
CERTIFICATE OF CORRECTION

PATENT NO. : 5 051 539
DATED : September 24, 1991
INVENTOR(S) : Susan LEATHERS-WEISSNER It is certified that error appears in the above-identified patent and that said Letters Patent is hereby corrected as shown below:

Column 5, line 6; after "order" insert ---to hold both---.
Column 6, line 61; replace "Claim 5" with ---Claim 1---.
Column 7, line 16; after "parts" insert ---each---.

Signed and Sealed this

Thirteenth Day of April, 1993

Attest:

STEPHEN G. KUNIN

*Attesting Officer*   *Acting Commissioner of Patents and Trademarks*